(12) United States Patent
Chang (10) Patent No.: US 7,066,853 B2
(45) Date of Patent: Jun. 27, 2006

(54) METHOD FOR MANUFACTURING AN INFLATABLE BALL AND A BALL MADE WITH THE METHOD

(76) Inventor: Yen-Li Chang, 7F-1, No. 96, Sec. 3, Chunghsiao E. Rd., Taipei (TW)

( * ) Notice: Subject to any disclaimer, the term of this patent is extended or adjusted under 35 U.S.C. 154(b) by 85 days.

(21) Appl. No.: 10/955,764

(22) Filed: Sep. 30, 2004

(65) Prior Publication Data

US 2006/0068951 A1    Mar. 30, 2006

(51) Int. Cl.
*A63B 41/10* (2006.01)

(52) U.S. Cl. ...................... 473/605; 156/172

(58) Field of Classification Search ........... 473/599, 473/608, 603–605; 156/170–172, 146, 147, 156/186

See application file for complete search history.

(56) References Cited

U.S. PATENT DOCUMENTS

| | | | |
|---|---|---|---|
| 3,256,019 A | 6/1966 | Barton | 156/170 |
| 4,187,134 A * | 2/1980 | Svub et al. | 473/605 |
| 4,191,375 A * | 3/1980 | Uruba et al. | 473/605 |
| 4,333,648 A * | 6/1982 | Aoyama | 473/604 |
| 5,681,233 A | 10/1997 | Guenther et al. | 473/605 |
| 5,931,752 A | 8/1999 | Guenther et al. | 473/697 |
| 6,123,633 A | 9/2000 | Guenther et al. | 473/604 |
| 6,506,135 B1 | 1/2003 | Ou | 156/172 |
| 6,544,133 B1 | 4/2003 | Ou | 473/604 |
| 6,638,189 B1 * | 10/2003 | Chang | 473/605 |
| 2004/0177916 A1 | 9/2004 | Chang | 156/170 |

* cited by examiner

*Primary Examiner*—Steven Wong
(74) *Attorney, Agent, or Firm*—Alan D. Kamrath; Nikolai & Mersereau, P.A.

(57) ABSTRACT

A method for manufacturing an inflatable ball has the following acts of: obtaining an inflatable bladder with a winding layer; coating thermoplastic glue on the winding layer; obtaining multiple thickened panels; coating thermoplastic glue on the thickened panels; arranging the thickened panels and the inflatable bladder inside a mold; and injecting thermal air into the inflatable bladder to make the winding layer combine with the multiple thickened panels. Wherein, each thickened panel is made of a leather layer and an optional filling layer and has a thickened middle area and multiple thinned edges around the thickened middle area. By eliminating the rubber layer in the prior arts, vulcanization is avoided. Moreover, heating the inflatable ball from inside of the mold avoids thermal deformation of outer pebbled patterns of the panels.

13 Claims, 7 Drawing Sheets

METHOD FOR MANUFACTURING AN INFLATABLE BALL AND A BALL MADE WITH THE METHOD

BACKGROUND OF THE INVENTION

1. Field of the Invention

The present invention relates to a method for manufacturing an inflatable ball, and more particularly to a method that makes the inflatable ball with excellent quality in a simplified and economical way. The inflatable ball made by this method is also disclosed.

2. Description of Related Art

A conventional inflatable game ball, such as a basketball, is basically composed of an inner bladder, a winding string layer forming around the bladder, an intermediate layer formed around the winding string layer, and a cover attached over the intermediate layer. Typically, the cover is achieved by attaching multiple panel pieces made of leather or artificial leather. In order to make the attachment of the panels easy and precise, the intermediate layer (so-called carcass) is formed around the bladder by pasting multiple thermoplastic rubber pieces on the winding layer with the bladder. Because the intermediate layer is made of rubber material, the inflatable bladder has to be vulcanized in a mold with heat and pressure to improve elasticity of the intermediate layer. Because the mold has multiple internal embossment patterns defined on an inner periphery of the mold, therefore, the intermediate layer is formed to have marking lines or channels corresponding to the embossment pattern for precisely arranging the panels on the intermediate layer. Additionally the outer surface of the intermediate layer has to be roughened to make the attachment of the cover panels secure. Lastly, the panels are manually attached around the intermediate layer.

According to the above description, manufacturing a conventional basketball is very troublesome and time-consuming, especially in the acts of forming the intermediate layer, vulcanizing the intermediate layer, roughening the intermediate layer and attaching the panels. Although there are several prior patents modifying conventional methods for manufacturing the basketball, the methods in those prior patents still have drawbacks that are illustrated as follow:

A first prior patent, U.S. Pat. No. 6,123,633 (hereinafter referred to as '633 patent), disclosed a game ball comprising a carcass and a plurality of cover panels secured to the carcass. The carcass has a lobular outer surface that is provided by a plurality of generally spherical portions, channels between adjacent spherical portions of the carcass, and recessed portions between each channel and the adjacent spherical portions. Each cover panel has a central portion secured to one of the spherical portions of the carcass and a side portion secured to one of the recessed surface portions. Each of the cover portions has a substantially uniform thickness of less than 1.25 mm and the central portions of the cover panels extend radially outwardly beyond the channels (see claim 1 and FIG. 3 of '633 patent). The basketball in '633 patent apparently shows the intermediate layer that is numbered as "34" in FIG. 3 and is formed by pasting multiple sheets of rubber so as to thermally mold into the intermediate layer (see column 3, lines 8 to 16).

Therefore, disadvantages of forming the intermediate layer still exist in '633 patent. Additionally, the cover panels 21 are extremely thin, about 0.031 inch (0.8 mm), whereby the cover panels 21 wrinkle easily when the cover panels 21 are coated with adhesive or secured on the intermediate layer 34. Manufacturing the basketball in '633 patent requires much time and skill, especially in the attachment of the cover panels 21.

A second prior patent, U.S. Pat. No. 5,931,752 (hereinafter referred as '752 patent, disclosed a basketball with a laid-in channel or logo basically having a carcass, a plurality of panels of cover material and pieces of laid-in material. The carcass has an inflatable bladder covered by an integral outer rubber layer 18 made by the same manner of '633 patent (see column 3, lines 3 to 12 and FIG. 4 of '752 patent). The plurality of panels of cover material is secured to the carcass while some portions on the carcass are not covered by the cover materials. The pieces of laid-in material have good grippability and are secured to the bare portions without overlapping the cover materials.

Therefore, disadvantages of forming the intermediate layer 18 (i.e. the rubber layer) still exist in '752 patent. The panels of cover material 12 are usually thin whereby the panels 12 wrinkle easily when the panels 12 are coated with adhesive or secured on the intermediate layer 18. Manufacturing the basketball in '752 patent still requires much time and skill, especially in the attachment of the panels 12.

A third prior patent, U.S. Pat. No. 5,681,233 (hereinafter referred as '233 patent), disclosed a basketball comprising an inflatable bladder, a layer of windings over the bladder, a plurality of panels of sponge rubber formed over the layer of windings, a plurality of strips of rubber, and panels of cover material, wherein the carcass of the basket ball excludes the panels of cover material (see column 2 lines 18 and 19). Although the intermediate layer is changed in name in '233 patent, the flat sheets of panels of sponge rubber 16 perform the intermediate layer as shown and described above by molding. In other words, the intermediate layer is the same as in the two prior patents. Moreover, it is noted that the rubber channel 13 is achieved by attaching and thermally molding two strips of rubber 17, 18 to form a bulged rubber channel 13 before the panels of cover material are attached to the carcass (see column 2, lines 20 to 40). The rubber strips 17, 18 are vulcanized into the underlying wound bladder and are thereby integrated with the wound bladder. The cover panels 12 are bonded or integrated with the rubber strips (see column 2, lines 47 to 50).

Apparently, the intermediate layer still exists and disadvantages of forming the intermediate layer remain in '233 patent. Manufacturing processes of '233 patent are complex because each layer and strip of rubber has to be thermally molded or vulcanized in different molds. Therefore, manufacturing basketball of '233 patent is troublesome, time-consuming and expensive.

With regard to a fourth prior art, a U.S. patent application Ser. No. 10/395,666 (hereinafter referred as '666 patent), disclosed a method for manufacturing a basketball comprising acts of: preparing an inflatable spherical bladder; surrounding the bladder with a winding string layer; respectively preparing a rubber sheet and a polyurethane sheet; combining the rubber sheet and the polyurethane sheet and then cutting them into multiple panels with desired shapes; attaching the multiple panels to the winding string layer to compose a basketball; and vulcanizing the basketball. Particularly, pebbled periphery of the basketball are formed in correspondence with an engraved pattern on an inner surface of molds when the basketball is heated in the mold for vulcanization.

According to the manufacturing acts in '666 patent, the basketball still has the intermediate layer (i.e. the rubber sheet). Therefore, thermal vulcanizing act is unavoidable if the rubber sheet is to be elastic and durable. Because the pebbled periphery of the basketball is molded inside the mold with the engraved pattern, the basketball can not be flexibly changed to various patterns unless the mold is changed to have different engraved pattern. Moreover, although the intermediate layer is previously attached to the polyurethane sheet (34, i.e. the cover material) to make the panels become thick enough to attach on the winding string layer easily, some temperature sensitive materials (such as logo foil) are easily deformed and decolored by heat in the vulcanizing act (about 150° C.). Therefore, the basketball has limitations in the application of the commonly used "temperature sensitive" materials on it surface.

To overcome the shortcomings, the present invention is focused on a method for manufacturing an inflatable ball having excellent quality in simplified procedures to mitigate or to obviate the aforementioned problems.

SUMMARY OF THE INVENTION

The main objective of the present invention is to provide a method for manufacturing an inflatable ball, which manufactures the inflatable ball with quick and simplified procedures and without vulcanization.

Another objective of the present invention is to provide a method for manufacturing an inflatable ball that has excellent quality in appearance.

In order to accomplish the foregoing objective, the method for manufacturing an inflatable ball comprises the following acts of:

obtaining an inflatable bladder having an inner space, a winding layer surrounding the inflatable bladder and an injecting nozzle communicating with the inner space;

coating thermoplastic glue on the winding layer of the inflatable bladder, wherein the thermoplastic glue dries quickly to avoid sticking;

obtaining multiple thickened panels, wherein each thickened panel is made of a leather layer and an optional filling layer and has an inner face, a thickened middle area and multiple thinned edges around the thickened middle area;

coating thermoplastic glue on the inner face of each thickened panel, wherein the thermoplastic glue dries quickly to avoid sticking;

arranging the multiple thickened panels inside a mold;

placing the inflatable bladder into the mold;

injecting warm air into the inflatable bladder at high pressure to make the winding layer abut the multiple thickened panels until the thermoplastic glue combines the inflatable bladder and multiple thickened panels together to achieve a ball;

removing the ball from the mold; and optionally, attaching multiple laid-in strips between adjacent multiple thickened panels.

By eliminating the rubber layer (the intermediate layer) as described in the prior arts, the manufacturing method in the present invention needs no vulcanization of the rubber layer. Therefore, manufacturing procedures in the present method are simplified and the ball is kept in excellent appearance because the panels are kept from thermal deformation otherwise occurring in the vulcanization.

Additionally, the multiple thickened panels are preset in the mold and the warm air inflates into the inflatable bladder to make all panels simultaneously and evenly attach to the winding layer by the thermoplastic glue so that manufacturing time is shortened.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
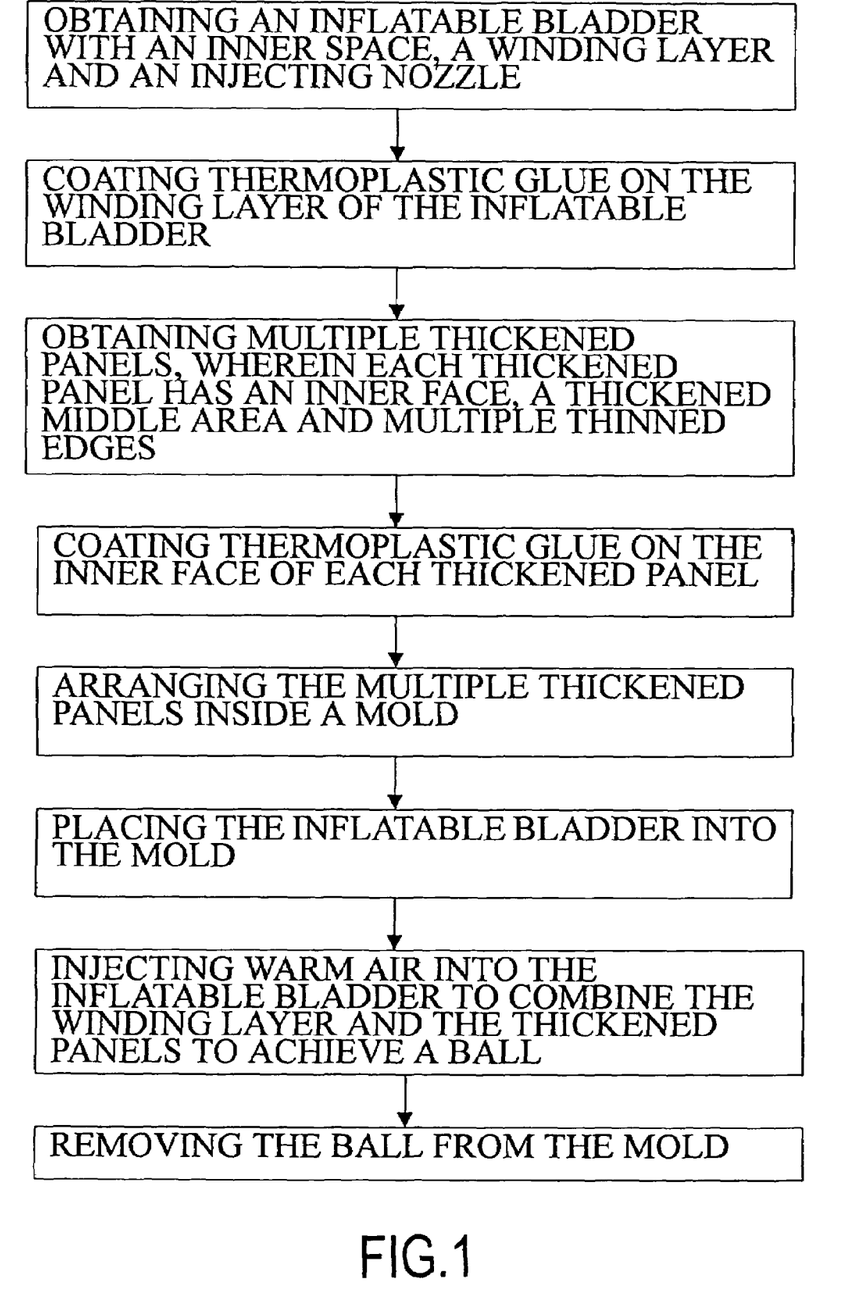
FIG. 1 is shows operational illustrating blocks of a method for manufacturing an inflatable ball in accordance with the present invention.

With reference to FIG. 1, a method for manufacturing an inflatable ball in accordance with the present invention comprises the following acts of:

obtaining an inflatable bladder having an inner space, a winding layer surrounding the inflatable bladder and an injecting nozzle communicating with the inner space;

coating thermoplastic glue on the winding layer of the inflatable bladder, wherein the thermoplastic glue dries quickly to avoid sticking;

obtaining multiple thickened panels, wherein each thickened panel is made of a leather layer and an optional filling layer and has an inner face, a thickened middle area and multiple thinned edges around the thickened middle area;

coating thermoplastic glue on the inner face of each thickened panel, wherein the thermoplastic glue dries quickly to avoid sticking;

arranging the multiple thickened panels inside a mold;

placing the inflatable bladder into the mold;

injecting warm air into the inflatable bladder at high pressure to make the winding layer abut the multiple thickened panels until the thermoplastic glue combines the inflatable bladder and multiple thickened panels together to achieve a ball;

removing the ball from the mold; and optionally, attaching multiple laid-in strips between adjacent multiple thickened panels.

Taking a basketball as an example, the manufacturing procedures in the present invention are further illustrated as follow. However, the inflatable ball can be other sports balls such as a volleyball, a soccer ball, or a football, and is not limited by this illustrative embodiment shown below.

Figure 2A:
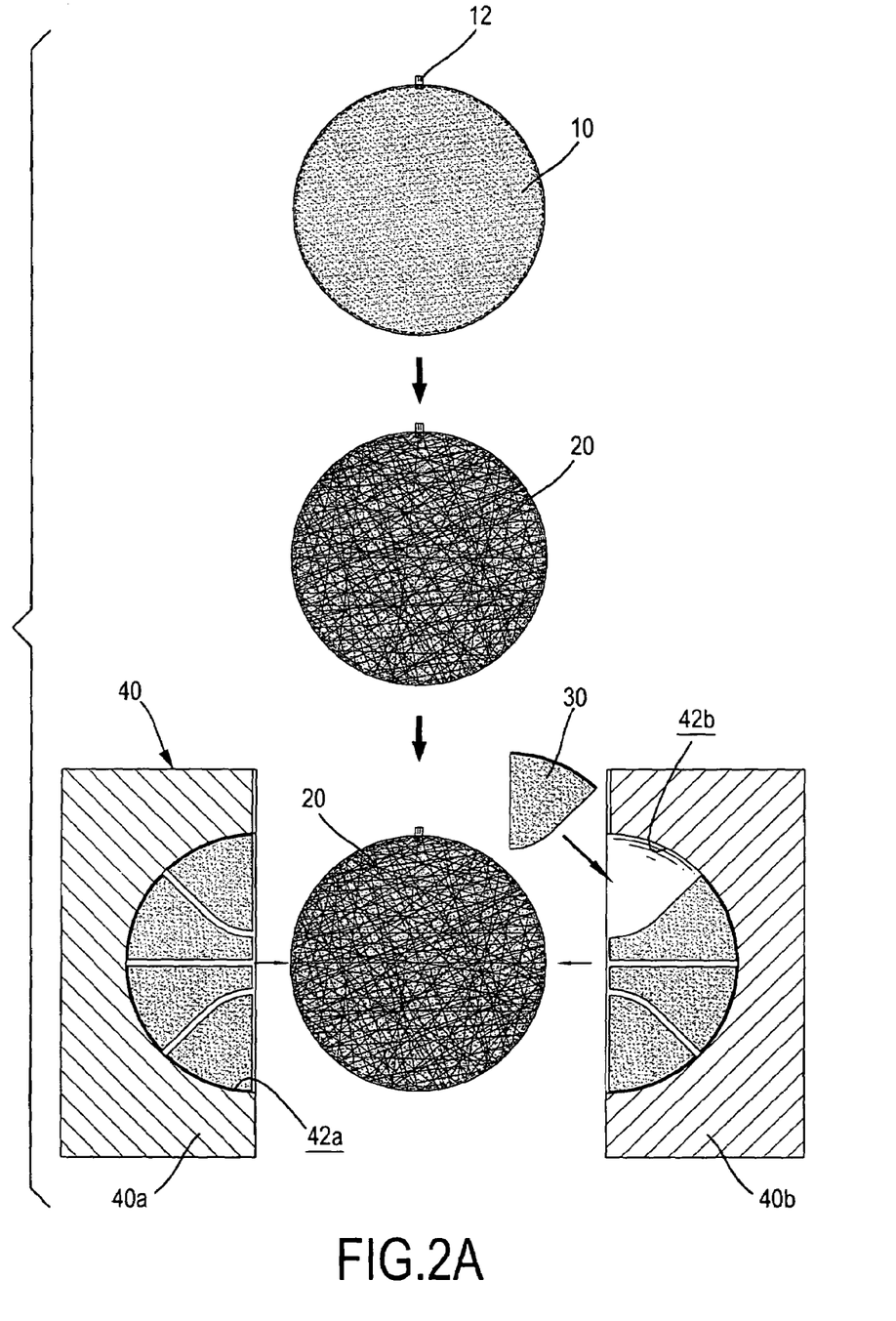
FIG. 2A is a first part of schematically operational views of a method for manufacturing an inflatable ball in accordance with the present invention.
Figure 2B:
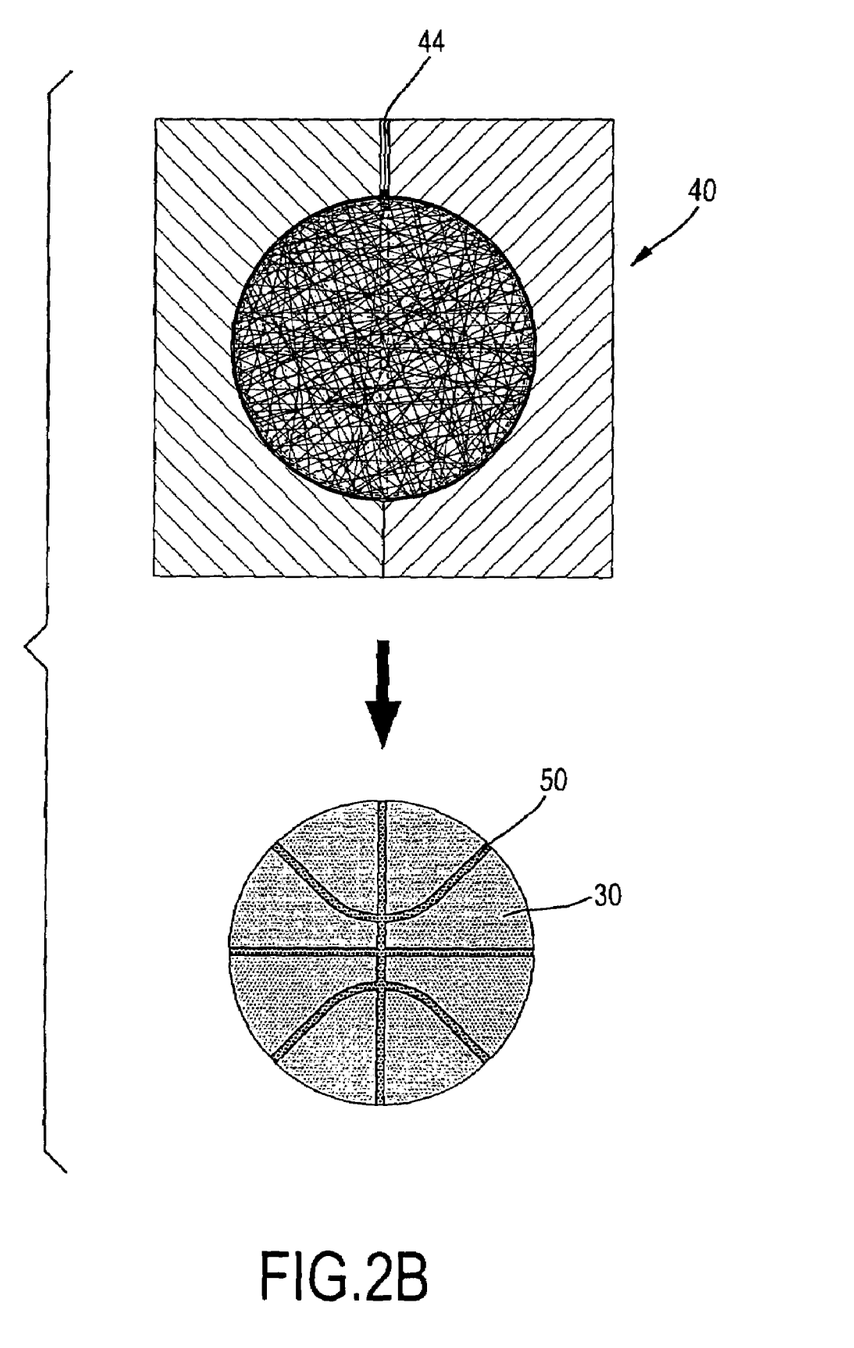
FIG. 2B is a second part of the schematically operational views of the method for manufacturing an inflatable ball, which follows FIG. 2A.

With reference to FIGS. 2A and 2B, an inflatable bladder (10) with an injecting nozzle (12) is obtained and inflated. Then, the inflatable bladder (10) is wound with reinforcing thread to form a winding layer (20). In the preferred embodiment, the winding layer (20) is composed of different types of reinforcing threads to make the winding layer (20) to have enough shaping reinforcement to the inflatable bladder (10) and to provide excellent rebounding capability. As described in prior arts, the reinforcing thread is optionally formed from 3200 meters of a 100% Nylon thread, a 100% polyester thread, or a composite thread of Nylon and polyester. Additionally, the reinforcing thread is preferably coated with latex or adhesive to keep itself in position without sliding aside when the reinforcing thread is wound around the inflatable bladder (10) so that the winding layer can be evenly formed on the inflatable bladder (10).

After forming the winding layer, thermoplastic glue in liquid form is coated on the winding layer and then cooled until the thermoplastic glue solidifies.

Figure 4:
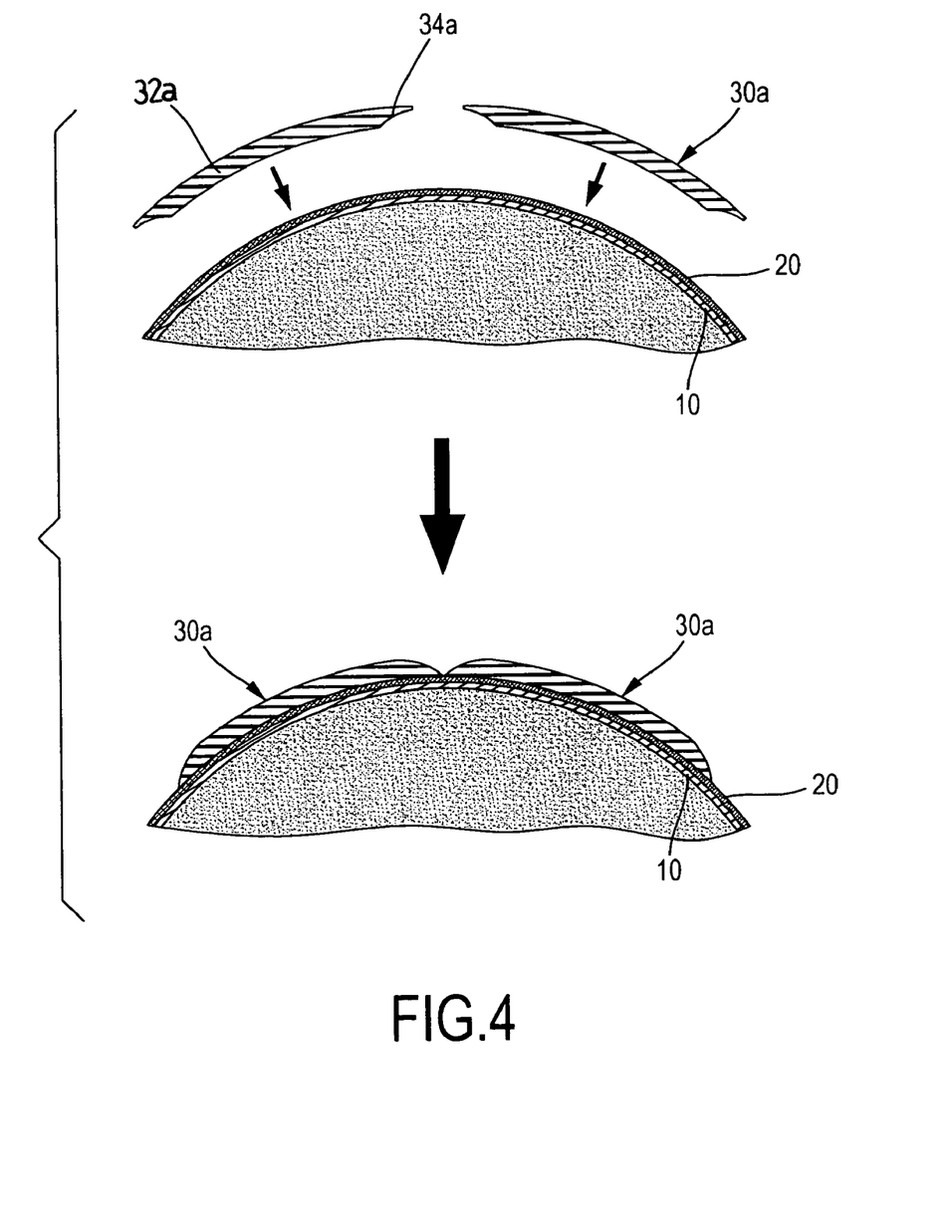
FIG. 4 shows operational views of a first embodiment of two thickened panels.
Figure 5:
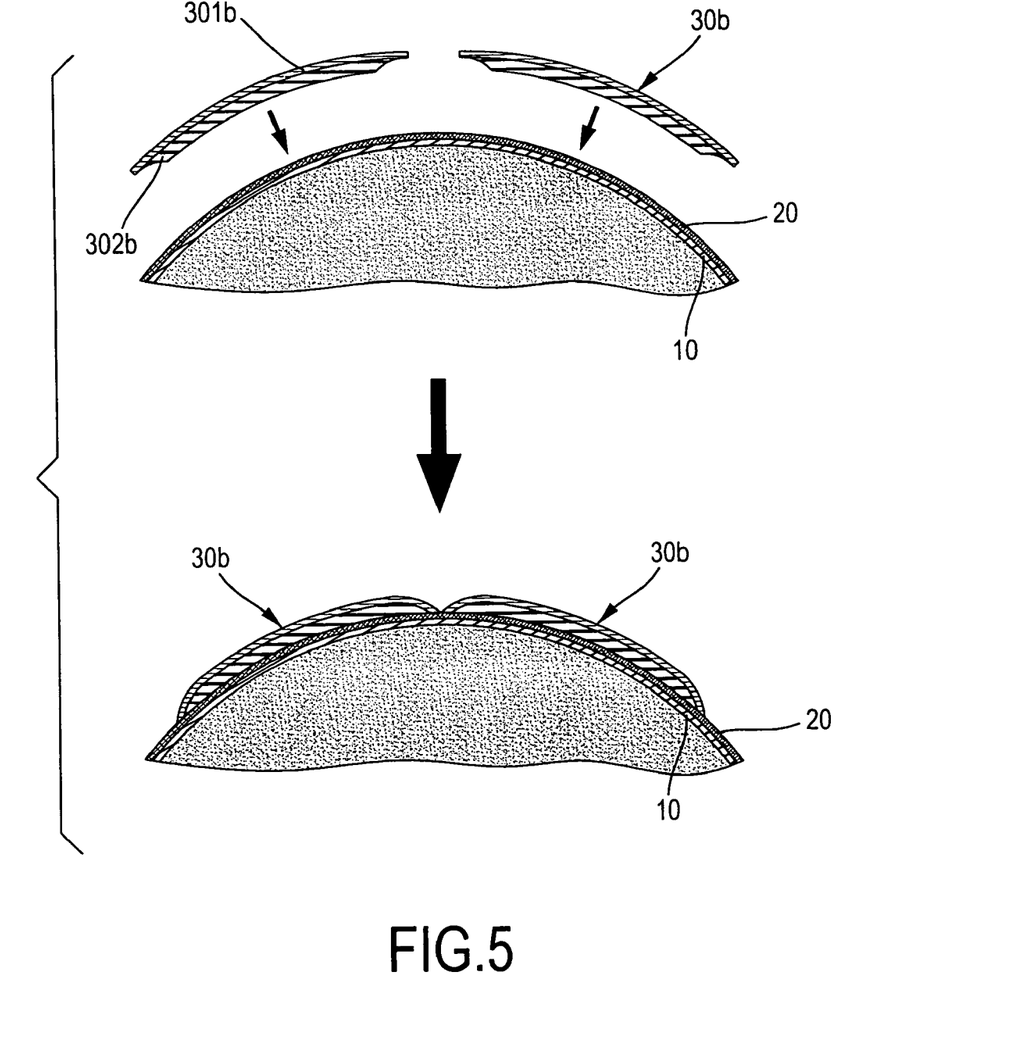
FIG. 5 shows operational views of a second embodiment of two thickened panels.

The multiple thickened panels (30) are obtained to attach to the winding layer (20) on the inflatable bladder (10) and are specifically designed to make the basketball embossed obviously in certain portions. Each thickened panel (30) is made of a leather layer and an optional filling layer and has an outer pebbled face, an inner face, a thickened middle area and multiple thinned edges around the thickened middle area. The leather layer is selectively made of genuine leather or artificial leather purchased from leather manufacturers in special order. Embodiments of the thickened panels are shown in FIGS. 4 and 5 and illustrations about the embodiments are set later after the method is completely described.

The inner face of each thickened panel (30) is coated with the thermoplastic glue that dries quickly. After the thermoplastic glue is solidified, the thickened panels are placed into a mold (40) in a desired arrangement. Practically, the mold is composed of two half bodies (40a, 40b) and each half body (40a, 40b) has a hemispherical engraved cavity (42a, 42b). When the two half bodies (40a, 40b) are combined together, the two hemispherical engraved cavities (42a, 42b) compose a ball chamber. Each hemispherical engraved cavity (42a, 42b) has multiple panel-dents for receiving the multiple thickened panels. Preferably, a depth of each panel-dent is slightly smaller than the thickness of the corresponding thickened panel (30) so that the thickened panel (30) can tightly abut with the bladder (10) inside the mold (40). Particularly, an air hole (44) is defined through the mold (40) to communicate with the ball chamber.

Figure 3:
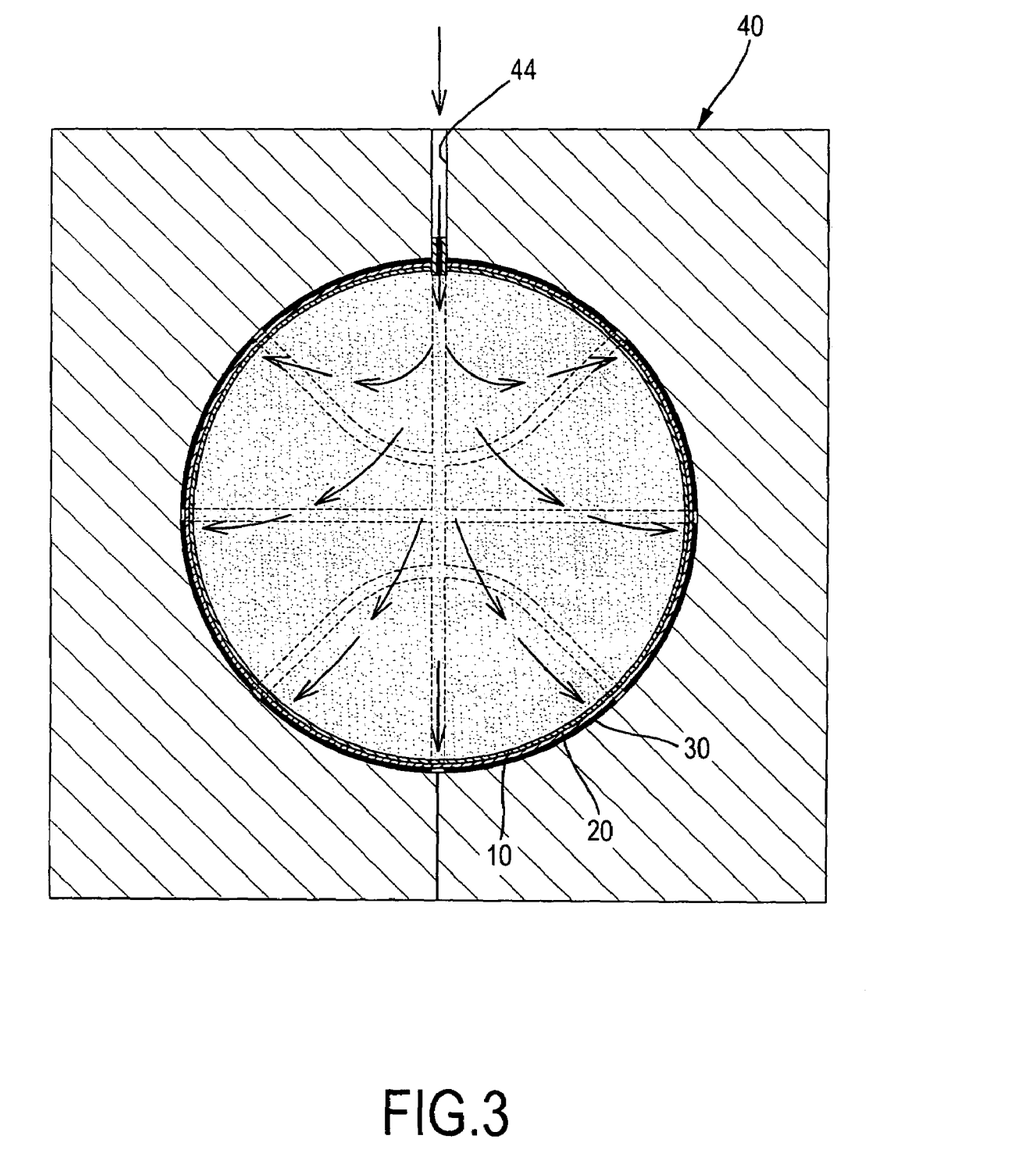
FIG. 3 is a schematically operational view of showing a process of air injection into a bladder within a mold.

After the inflatable bladder (10) is placed into the mold (40), the air-injecting nozzle (12) is received inside the air hole (44) of the mold. Then, warm air at 50 to 60° C. is compressed and injected into the inner space to inflate the inflatable bladder (10) via the air hole (44) and the air-injecting nozzle (12). The thermal compression by warm air lasts for 60 to 120 seconds to make the thickened panels (30) completely attach on the inflatable bladder (10). The compressed air provides an inner pressure to force the inflatable bladder (10) to abut the multiple thickened panels (30) in arrangement. Meanwhile, heat of the warm air melts the thermoplastic glue on the winding layer and the thickened panels (30) to fuse together. With particular reference to FIG. 3, because the inner pressure is evenly distributed inside the inner space of the inflatable bladder (10), the multiple thickened panels (30) can evenly attach to the winding layer (20) at the same time. Therefore, manufacturing time for attaching the thickened panels (30) is greatly shortened. Moreover, the thickened panels (30) have sufficient rigidity caused by the thickened middle area and do not cause any wrinkles when the thickened panels (30) are attached on the winding layer (20). The characteristic of injecting warm air into the bladder (10) is that the heat is transmitted from inside out so that the pebbled outer surface of the leather layer has lower temperature and is not thermally deformed easily. Therefore, an attractive and neat appearance of the basketball is kept when the thermoplastic glue is fusing together.

Figure 6:
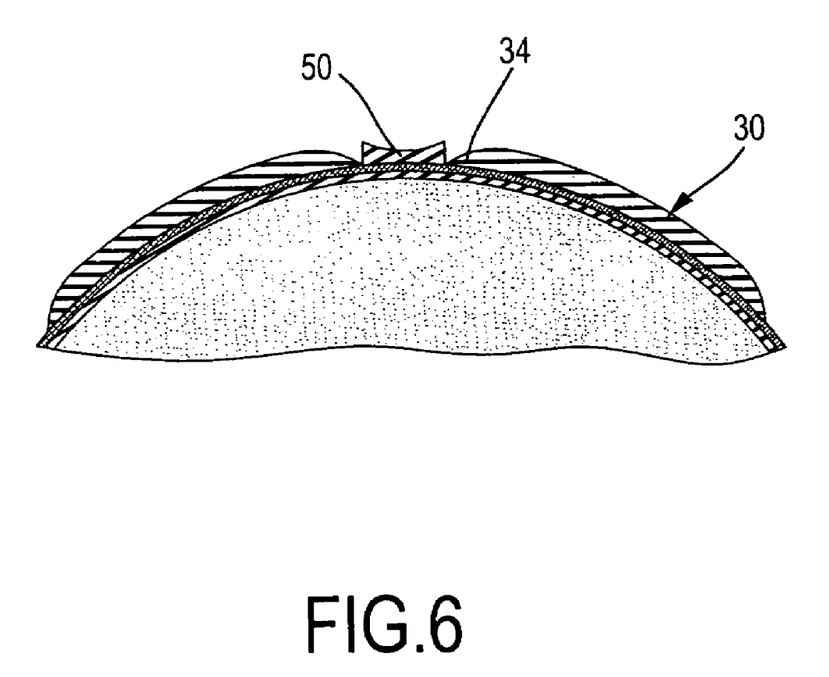
FIG. 6 shows another arrangement of the panels, wherein a channel is defined between two adjacent thickened panels.

When the thickened panels (30) and the winding layer (20) are combined together, the basketball is removed from the mold (40). With further reference to FIGS. 4 and 6, when the thickened panels (30) attach to the winding layer, thinned edges (34) of the thickened panels (30) are bent to contact with the winding layer (20). Therefore, a groove (in FIG. 4) or a space (in FIG. 6) is defined between two adjacent thickened panels (30) to perform a sense of thickness of the thickened panels (30) and appearance of the basketball is embossed at the thickened middle areas (32) of the thickened panels (30). Optionally, a laid-in strip (50) is arranged inside the mold with the multiple thickened panels (30) to correspondingly attach to the space to cover the bare winding layer (20) to make the basketball have a neat appearance.

According to the above description, the inflatable ball (basketball) made with the above method comprises an inflatable bladder (10) with an air-injecting nozzle, a winding layer (20) surrounding around the inflatable bladder (10), multiple thickened panels (30) mounted on the winding layer (20) and multiple optional laid-in strips (50). Improvements to the basketball of the present invention are a result of the multiple thickened panels (30). The characteristics of the thickened panels (30) are illustrated as follow in different embodiments.

With reference to FIG. 4, the thickened panel (30a) is made of one synthetic leather layer in one-piece having a range of 1.5–3.0 mm in thickness at the thickened middle area (32a). The thickness of the thickened middle area further has a preferable range of 1.8–2.5 mm. The thinned edges (34a) surrounding the thickened middle area (32a) has a preferred 0.8 mm thickness and are formed by slicing out in a gradient from the inner face to the outer pebbled face of each thickened panel (30a). A horizontal distance of the gradient of the thinned edge has a range of 0.3–1 cm. The horizontal distance of the gradient is preferable about 0.5 cm.

With reference to FIG. 5, the thickened panel (30b) is composed of two leather layers, one is an outer leather layer (301b) preferably made of genuine leather or artificial leather and the other is an inner filling layer (302b) preferably made of ethylene-vinyl acetate (EVA) or other foaming plastics. Because some genuine leather only has a thickness of 1.2–1.8 mm, which does not satisfy the requirement of the thickened panels (30b) in the present invention, the inner filling layer (302b) is attached to the outer layer (301a) to make the thickened panel (30b) have 1.5–3.0 mm thickness. Moreover, the inner filling layer (302b) can be selectively modified in thickness and foaming material to change flexibility of the basketball to satisfy different requirements from consumers.

In the two embodiments of FIGS. 4 and 5, because two adjacent thickened panels (30a, 30b) are connected with each other to completely cover the winding layer (20), the laid-in strip (50) is not necessary to the achieved basketball. The thinned edges (34a, 34b) at joints are bent to attach the winding layer (20) to perform a groove between the two adjacent thickened panels (30a, 30b). With reference to FIG. 6 again, when the two adjacent thickened panels are not connected with each other, a space is formed and the laid-in strip (50) is attached to fill the space to cover the bare winding layer (20). Preferably, the laid-in strip (50) has a color different to the outer pebbled surface of the thickened panels to make the basketball vivid in appearance.

The characteristic of the inflatable ball in the present invention is that each thickened panel (30) has a thickened middle area and multiple thinned edges formed around the thickened middle area. Therefore, the thickened panels (30)

do not cause any wrinkle when they are attached to the winding layer (20). Moreover, the thickened panels (30) are made of leather layer and an optional filling layer made of forming material, which excludes rubber material, to operationally simplify manufacturing procedures without vulcanization in the method of the present invention.

According to the above description, the present invention has the following advantages in manufacturing method and structure of the inflatable ball:

1. By eliminating the intermediate layer (the rubber layer), the manufacturing method in the present invention has no vulcanizing act and is simplified.

2. Instead of manual attachment of the panels, the thickened panels in the present invention are arranged inside the mold and thermally compressed to attach on the winding layer at the same time. Therefore, the attachment of the thickened panels is easy and convenient and the manufacturing time and labor cost are greatly reduced.

3. By injecting the warm air into the inflatable bladder for thermal compression, all thickened panels can be evenly attached to the winding layer. Moreover, the outer surface of the thickened panels is not thermally deformed easily because the heat is transmitted from inside of the mold to keep the inflatable ball in excellent appearance.

4. The thickened panels have thickened middle areas to provide sufficient rigidity to avoid wrinkles when the panels are attached on the winding layer. The thickened areas of the thickened panels also make the inflatable ball embossed in appearance.

It is to be understood, however, that even though numerous characteristics and advantages of the present invention have been set forth in the foregoing description, together with details of the structure and function of the invention, the disclosure is illustrative only, and changes may be made in detail, especially in matters of shape and size of the product and sequence of acts within the principles of the invention to the full extent indicated by the broad general meaning of the terms in which the appended claims are expressed.

What is claimed is:

1. A method for manufacturing an inflatable ball, the method comprising acts of:
   obtaining an inflatable bladder having an inner space, a winding layer surrounding the inflatable bladder and an injecting nozzle communicating with the inner space;
   coating thermoplastic glue on the winding layer of the inflatable bladder;
   obtaining multiple thickened panels, wherein each thickened panel is made of a leather layer and has an inner face, a thickened middle area and multiple thinned edges around the thickened middle area;
   coating thermoplastic glue on the inner face of each thickened panel;
   arranging the multiple thickened panels inside a mold;
   placing the inflatable bladder into the mold;
   injecting compressed warm air into the inflatable bladder to make the winding layer abut the multiple thickened panels until the thermoplastic glue combines the inflatable bladder and multiple thickened panels together to achieve the ball; and
   removing the ball from the mold.

2. The method as claimed in claim 1, wherein the method further comprising an act of attaching multiple laid-in strips between the adjacent multiple thickened panels.

3. The method as claimed in claim 2, wherein the act of attaching the multiple laid-in strips is achieved by arranging the multiple thickened panels in the mold and then thermally compressing the thickened panels with the warm air to combine the thickened panels with the winding layer.

4. The method as claimed in claim 1, wherein the compressed warm air is injected into the inflatable bladder at 50 to 60° C. for a duration of 60 to 120 seconds.

5. The method as claimed in claim 1, wherein each thickened panel further has a filling layer made of foam material formed under the leather layer.

6. An inflatable ball made with the method in claim 1, the inflatable ball comprising:
   an inflatable bladder (10) with an air-injecting nozzle (12);
   a winding layer (20) surrounding around the inflatable bladder (10); and
   multiple thickened panels (30) mounted on the winding layer (20);
   wherein, the improvement of the inflatable ball is that each thickened panel is made of a leather layer and has an outer pebbled face, an inner face, a thickened middle area and multiple thinned edges around the thickened middle area.

7. The inflatable ball as claimed in claim 6, wherein the leather layer is made of synthetic leather.

8. The inflatable ball as claimed in claim 6, wherein each thickened panel further has a filling layer made of foaming material and formed under the leather layer.

9. The inflatable ball as claimed in claim 7, wherein each thickened panel further has a filling layer made of foaming material and formed under the leather layer.

10. The inflatable ball as claimed in claim 6, wherein a space is defined between two adjacent thickened panels and a laid-in strip is attached inside the space.

11. The inflatable ball as claimed in claim 6, wherein each thickened panel has a thickness of 1.5–3.0 mm at the thickened middle area and a thickness of 0.8 mm at each of the thinned edges; and
   each thinned edge is formed in a gradient having a horizontal distance of the gradient of the thinned edge about 0.3–1 cm.

12. The inflatable ball as claimed in claim 11, wherein the thickness at the thickened middle area is preferable 1.8–2.5 mm; and
   the horizontal distance of the gradient of the thinned edge is preferable 0.5 cm.

13. The inflatable ball as claimed in claim 12, wherein the winding layer is composed of a reinforcing thread;
   wherein the reinforcing thread is made of material selected from the group consisting of Nylon thread, polyester thread, and a composite thread of Nylon and polyester.

* * * * *